United States Patent [19]
Cho

[11] Patent Number: 5,680,176
[45] Date of Patent: Oct. 21, 1997

[54] APPARATUS FOR CONTROLLING CAPTION DISPLAY ON A WIDE ASPECT RATIO

[75] Inventor: Min-Soo Cho, Seoul, Rep. of Korea

[73] Assignee: Daewoo Electronics, Co., Ltd., Seoul, Rep. of Korea

[21] Appl. No.: 578,302

[22] Filed: Dec. 26, 1995

[30] Foreign Application Priority Data

Jun. 28, 1995 [KR] Rep. of Korea ............ 95-17663

[51] Int. Cl.$^6$ .................................................. H04N 5/445
[52] U.S. Cl. ................ 348/564; 348/589; 348/600
[58] Field of Search ................................ 348/563, 564, 348/584, 586, 588, 589, 598, 599, 600, 468, 473, 476, 477; H04N 5/445, 9/74, 9/76, 7/08, 7/087

[56] References Cited

U.S. PATENT DOCUMENTS

| | | | |
|---|---|---|---|
| 4,862,269 | 8/1989 | Sonoda | 348/564 |
| 5,065,230 | 11/1991 | Kumano | 348/588 |
| 5,168,362 | 12/1992 | Yoshida . | |
| 5,517,251 | 5/1996 | Rector | 348/588 |

Primary Examiner—Sherrie Hsia
Attorney, Agent, or Firm—Pennie and Edmonds, LLP

[57] ABSTRACT

A television receiver includes a caption data display control circuit for controlling display of caption data contained an image of input standard video signal on a display screen for a wide aspect ratio in a full screen display mode for displaying the image on the entire display screen. In the caption data display control circuit, a luminance signal contained in the input standard video signal is converted into a first set of pixel values corresponding to all of the pixels consisting of the image. The second set of pixel values representing the caption data from values of pixels is then automatically detected by a detection circuit thereof from a first predetermined image region within the image. The detected second set of pixel values is converted into a caption signal denoting the caption data which is combined with the luminance signal in order to be displayed on a visible area of the display screen.

14 Claims, 4 Drawing Sheets

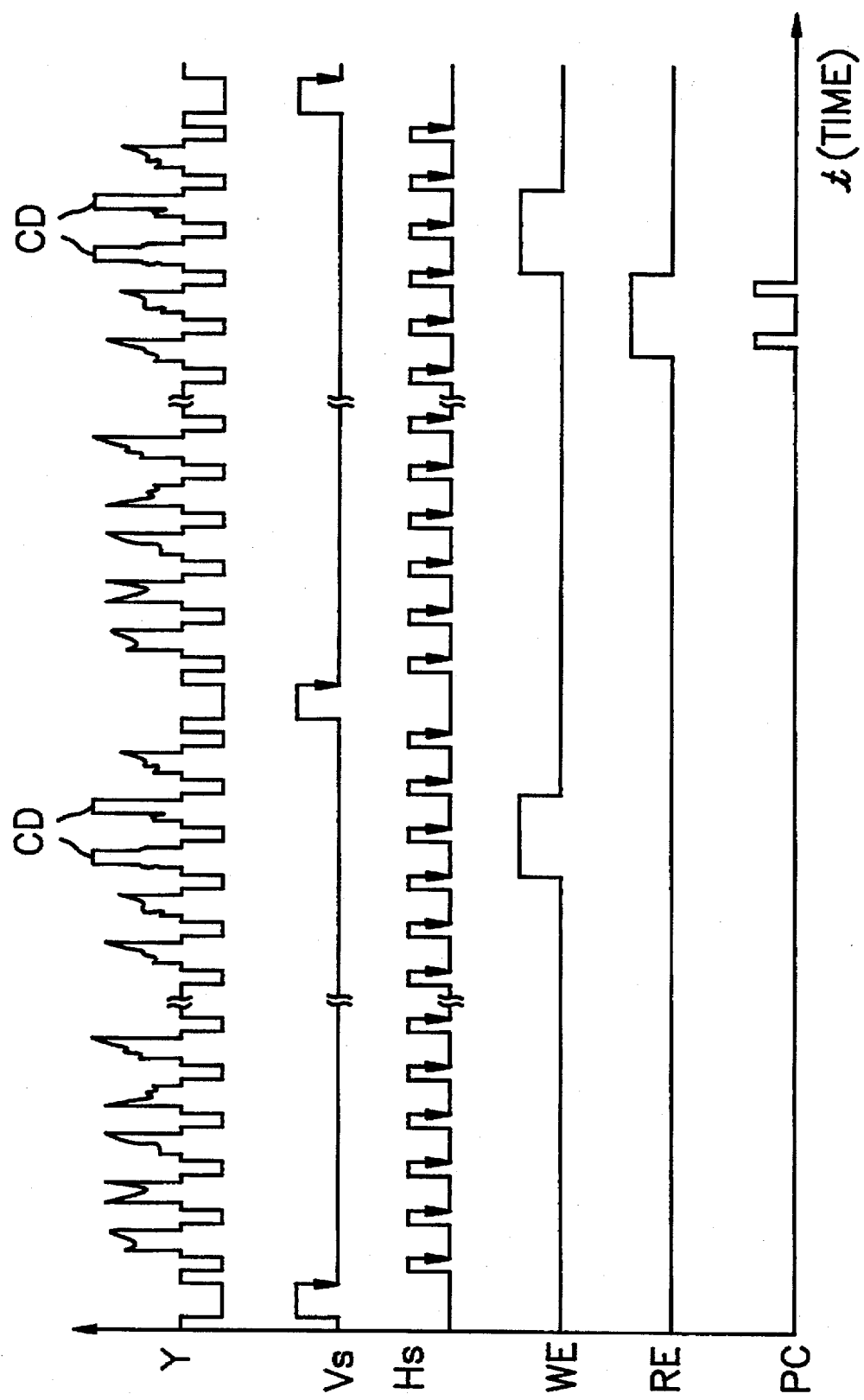

5,680,176

APPARATUS FOR CONTROLLING CAPTION DISPLAY ON A WIDE ASPECT RATIO

FIELD OF THE INVENTION

The present invention relates to a color television system having a display screen of a wide aspect ratio; and, more particularly, to an apparatus for use in the color television system which is capable of automatically controlling display of caption data contained in a standard video signal on a display device thereof having the wide aspect ratio.

DESCRIPTION OF THE PRIOR ART

As is well known, an image display apparatus, such as a television receiver, is provided with a display device, such as a CRT (cathode ray tube) or a liquid crystal display device, adapted to display an image thereon. The display device of the television receiver generally has two types of display screen wherein one of them fits to an image with a standard aspect ratio of 4:3 employed in an ordinary television broadcasting system, while the other is suitable for an image with a wide aspect ratio of 16:9 employed in, e.g., a HDTV broadcasting system.

In a regular television broadcasting system, such as NTSC system, a video signal is adopted to represent an image with a standard aspect ratio of 4:3. For this reason, a television receiver equipped with a screen suitable for displaying an image of the wide aspect ratio of 16:9 needs a video processing circuit capable of displaying images having both aspect ratios, 4:3 and 16:9.

One of such television receivers equipped with a display screen suitable for displaying an image with the wide aspect ratio is disclosed in U.S. Pat. No. 5,168,362 issued on Dec. 1, 1992, wherein the television receiver includes a video processing circuit having an aspect ratio conversion circuit adopted for displaying images of both ratios of 4:3 and 16:9. Specifically, in order to display an image with the aspect ratio of 4:3, the video processing circuit utilizes two display modes, i.e., a full image display mode and a full screen display mode. In the full image display mode, a whole image of the standard video signal is shown on a part of the display screen, extending over three quarters in the horizontal direction and the entire range in the vertical direction thereof, so that left- and right-hand side regions of the display screen are masked with a single color signal and the image is centered on the screen. On the other hand, in the full screen display mode, a major part of an image of the standard video signal is shown on the entire display screen, wherein parts of an upper most and a lower most regions of the image in the vertical direction are projected outside of the display screen, thereby invisible to a viewer, while the whole image in the horizontal direction is projected over the entire horizontal length of the display screen.

Meanwhile, in the ordinary standard television system, a video signal may contain caption data usually located on a predetermined lower region of the image thereof. Therefore, in the prior art television receiver, when a video signal with caption data is displayed in a full screen display mode, the caption data, being located on a predetermined lower region of the image may be cut out of the display screen, and, therefore, may not be shown on the display screen.

SUMMARY OF THE INVENTION

It is, therefore, a primary object of the invention to provide an apparatus for use in a color television system which is capable of automatically controlling the display of caption data contained in a standard video signal on a display device adapted to displaying an image of a wide aspect ratio in a full screen display mode.

In accordance with one embodiment of the present invention, there is provided an apparatus for controlling the display of caption data contained in an image of an input standard video signal on a display screen of a television receiver, wherein the input standard video signal includes a luminance signal having the caption data and horizontal and vertical sync signals, the display screen suitable for displaying an image of an aspect ratio different from that of the image of the input standard video signal and the television receiver using a full screen display mode to display the image of the input standard video signal on the entire display screen, which comprises:

a control circuit, in response to horizontal sync signals, for generating clock signals and, in response to vertical and horizontal sync signals, respectively, for generating vertical sync detection signals and horizontal sync count signals;

a first conversion circuit, in response to the clock signals, for converting the luminance signal into a first set of pixel values corresponding to all of the pixels constituting the image of the input standard video signal;

a detection circuit, in response to the clock signals, the vertical sync detection signals and the horizontal sync count signals, for detecting a second set of pixel values representing the caption data from values of pixels located on a first predetermined image region within the image to generate the second set of pixel values and caption data position information denoting pixel positions within a second predetermined image region;

a second conversion circuit, in response to the clock signals, for converting the second set of pixel values into a caption signal representing the caption data; and a combining circuit for combining the caption signal with the luminance signal in accordance with the caption data position information in order to display the caption data on a visible region of the display screen in the full screen display mode.

BRIEF DESCRIPTION OF THE DRAWINGS

The above and other objects and features of the present invention will become apparent from the following description of preferred embodiments given in conjunction with the accompanying drawings, in which:

FIG. 4 represents a timing diagram showing the operation of the caption data display control circuit shown in FIG. 3.

DETAILED DESCRIPTION OF THE PREFERRED EMBODIMENTS

Figure 1:
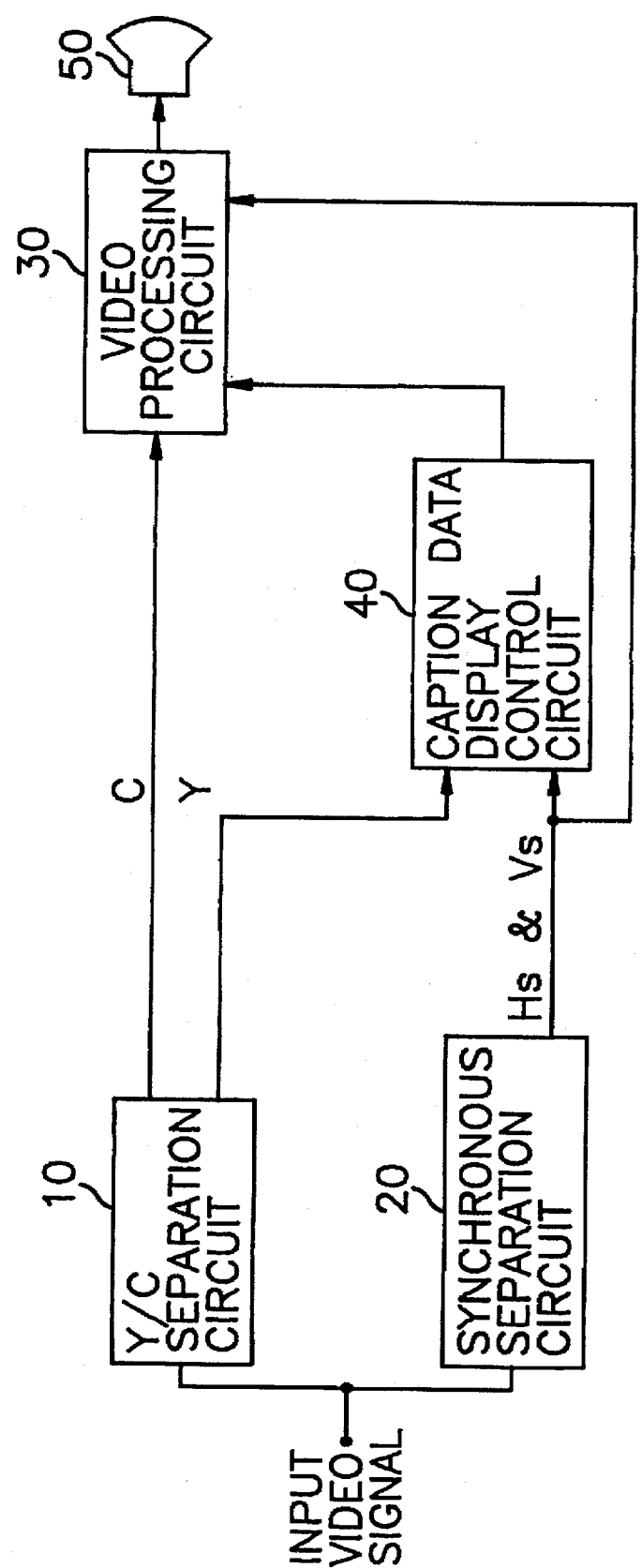
FIG. 1 shows a schematic block diagram of a television receiver employing a caption data display control circuit in accordance with the present invention.

Referring to FIG. 1, there is shown a schematic block diagram of a television receiver employing a caption data display control circuit in accordance with the present invention. The television receiver includes a luminance and chrominance (Y/C) separation circuit 10, a sync separation circuit 20, a video processing circuit 30, a caption data display control circuit 40 and a display device 50.

Input television signals, as is well known in the art, are received via a conventional antenna to a tuning and demodulating circuit (not shown) which selects an input television signal commensurate with a selected channel and demodulates it to form video and audio signals. The video signal is then supplied to the Y/C separation circuit 10 and the sync separation circuit 20, wherein the video signal includes luminance, chrominance and sync signal components forming an image of a standard aspect ratio of 4:3.

The Y/C separation circuit 10 serves to separate the video signal into a luminance signal Y representing the image in gray levels and a chrominance signal C containing color information thereof. The chrominance signal C is sent to the video processing circuit 30 and the luminance signal Y is relayed to the caption data display control circuit 40. On the other hand, in the synchronous separation circuit 20, the sync signal extracted from the video signal is sent to the video processing circuit 30 and the caption data display control circuit 40, wherein the sync signal includes vertical and horizontal sync signals Vs and Hs, respectively.

The caption data display control circuit 40 extracts the caption data from a predetermined image region of the luminance signal Y using the vertical and the horizontal sync signals Vs and Hs and produces a luminance signal having position-controlled caption data, as will be described herein below. The luminance signal is then coupled to the video processing circuit 30.

The video processing circuit 30 has two processing paths, i.e., luminance and chrominance signal processing paths. As is well known in the art, in the chrominance signal processing path, the chrominance signal C is processed by using a signal amplification stage as well as an automatic color control(ACC) and an automatic phase control(APC) stages, and the processed chrominance signal is then demodulated into a color difference signal.

In the luminance signal processing path, the combined luminance signal having the position-controlled caption data is amplified and adjusted by using predetermined operating parameters thereof, wherein the operating parameters of the video signal processing circuit 30 include contrast, brightness, color, tint, and sharpness which can be manually set by the user. The adjusted luminance signal is then combined with the color difference signal in a conventional matrix stage which generates the color representative signal. The color representative signal is adjusted in accordance with two display modes, i.e., a full image display mode and a full screen display mode, and then sent to the display device 50.

Figure 2A:
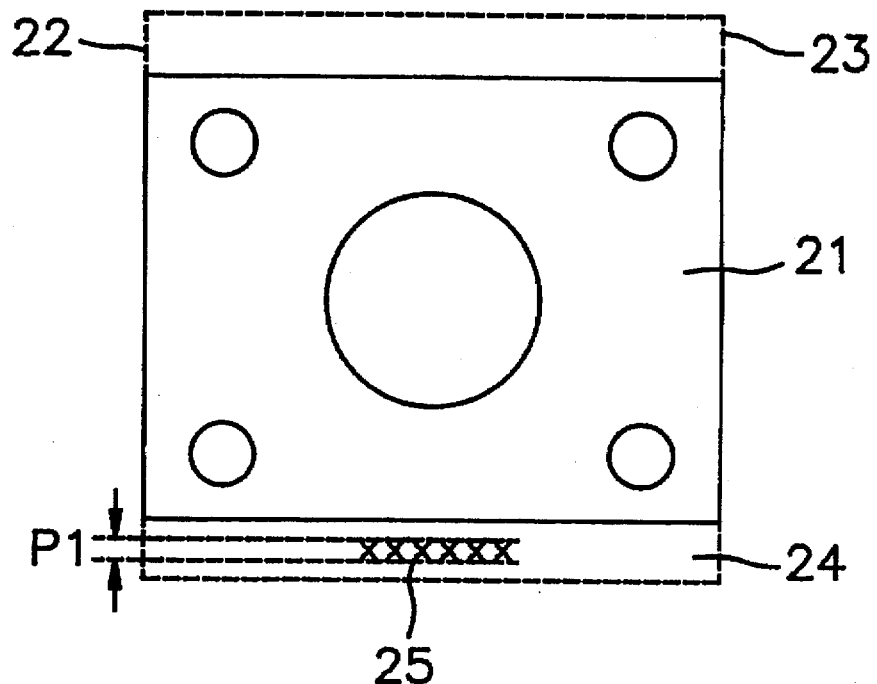
FIGS. 2A and 2B present exemplary diagrams demonstrating the operation of the caption data display control circuit shown in FIG. 1.
Figure 2B:
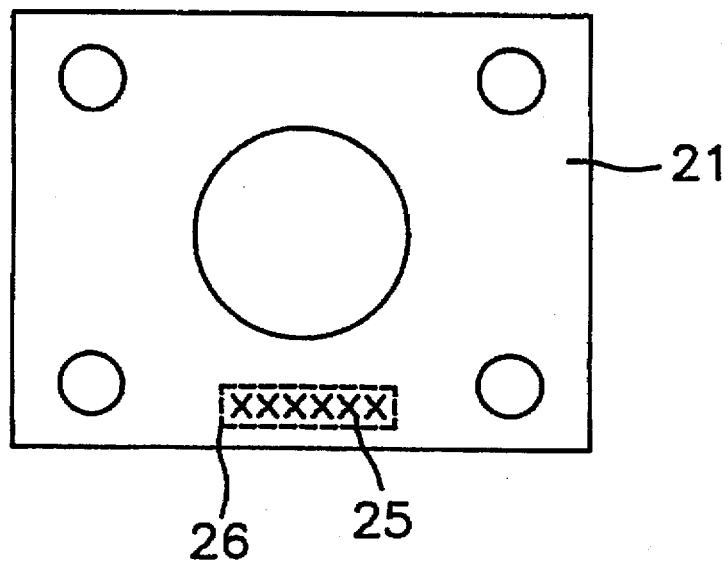

Referring to FIGS. 2A and 2B, there is shown a display screen of the display device 50 for the full screen display mode. As shown in FIG. 2A, when the color representative signal representing the video signal is supplied to the display device 50 shown in FIG. 1, the electron beams produced by the display device are swept in raster to form an image on the screen 21 fit for an image of a wide aspect ratio, e.g., 16:9. As described above, in the full screen display mode, the image 22 having an aspect ratio of 4:3 is projected over the entire display screen 21 and over extended areas in the vertical direction of the display screen 21 wherein upper and lower regions of the image 23 and 24 are projected outside the display screen 21. In this case, the caption data 25, normally formed of a white level and located on a predetermined lower region of the image 24 may be cut from the visible display area thereof. In accordance with the present invention, the caption data 25 is extracted from the predetermined image region P1 of the luminance signal and is then position-controlled by the caption data display control circuit 40 shown in FIG. 1. That is, as shown in FIG. 2B, the extracted caption data 25 is displayed on a second predetermined image region 26 within the display screen 21 as shown in FIG. 2B.

Figure 3:
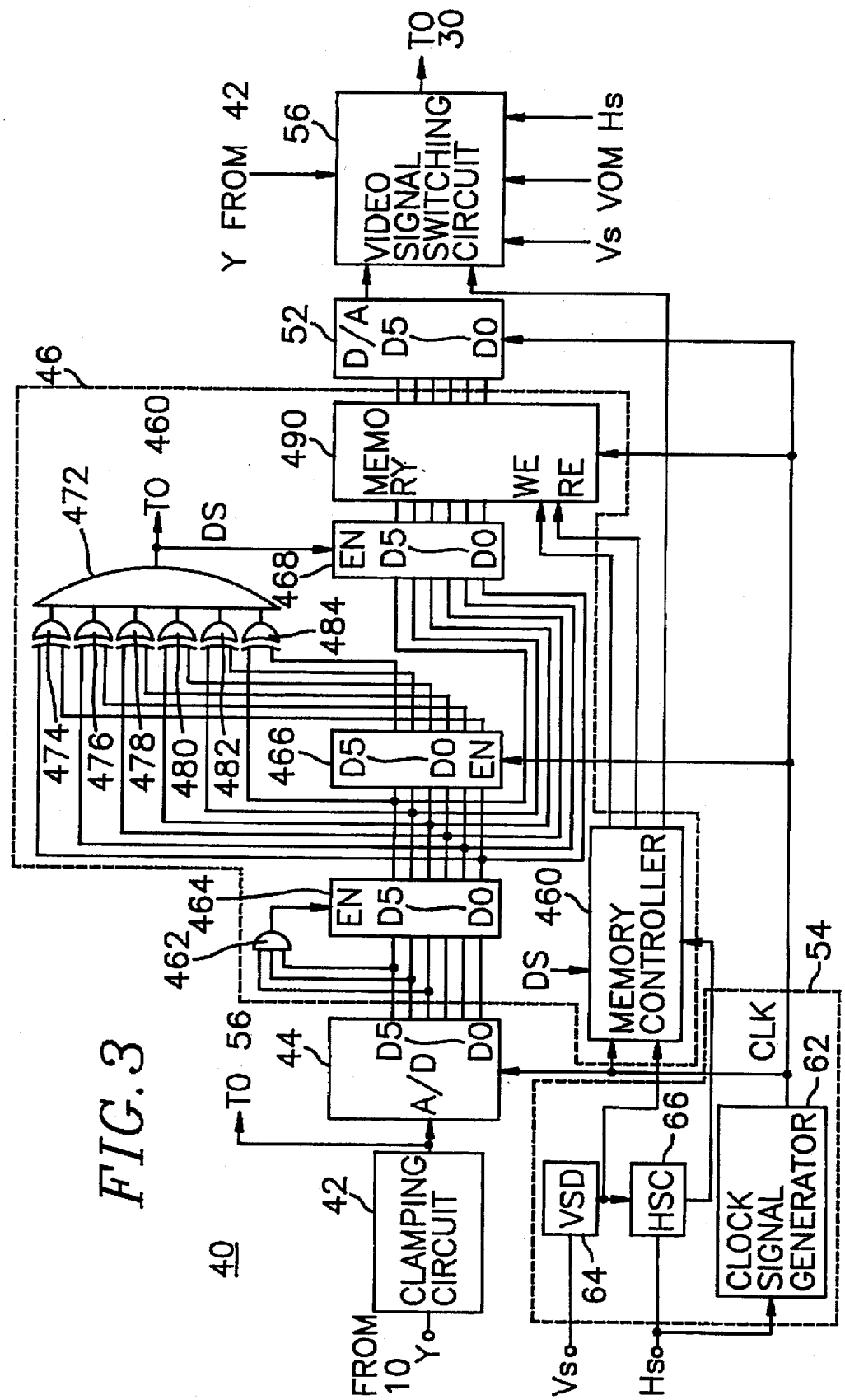
FIG. 3 provides a detailed diagram of the caption data display control circuit shown in FIG. 1.

Referring to FIGS. 3 and 4, there are shown a circuit diagram of the caption data display control circuit 40 shown in FIG. 1. and a timing diagram illustrating the operation thereof. In accordance with a preferred embodiment of the present invention, the caption data display control circuit 40 includes a clamping circuit 42, an analog to digital(A/D) converter 44, a caption data detection circuit 46, a digital to analog(D/A) converter 52, a control signal generation circuit 54 and a video signal switching circuit 56.

The luminance signal from the Y/C separation circuit 10 is supplied to the clamping circuit 42 which clamps a pedestal level of the luminance signal, i.e., a black level and generates a level-adjusted luminance signal which is relayed to the A/D converter 44 and the video signal switching circuit 56.

The control signal generation circuit 54, including a clock signal generator 62, a vertical sync(Vs) detector (VSD) 64 and a horizontal sync(Hs) counter (HSC) 66, receives a sync signal (the vertical and the horizontal sync signals Vs and Hs shown in FIG. 4) and generates a control signal which includes clock signals CLK, vertical sync detection signals and horizontal sync count signals.

The clock signal generator 62 receives the horizontal sync signals Hs shown in FIG. 4 and generates the clock signals CLK which are relayed to the A/D converter 44, the caption data detection circuit 46 and the D/A converter 52. The VSD 64 receives each of the vertical sync signals Vs and produces a Vs detection signal. The Vs detection signal is then supplied to the HSC 66 and the caption data detection circuit 46. In the HSC 66, each of the horizontal sync signals Hs is counted so that the Hs count signal is generated and supplied to the caption data detection circuit 46 wherein the count operation is initiated by the Vs detection signal.

In the A/D converter 44, the level-adjusted luminance signal is converted by using the clock signals CLK as a sampling signal into a first set of pixel values corresponding to a set of pixels constituting the image, wherein each of the pixel values is preferably represented by 6 bits and represents one of the gray levels, i.e., from a black level to a white level. The first set of pixel values is then supplied to the caption data detection circuit 46 which includes a memory controller 460, AND gates 462 and 472, exclusive NOR logic gates, 474, 476, 478, 480, 482 and 484, buffers 464, 466 and 468, and a memory 490.

The caption data detecting circuit 46 detects a second set of pixel values constituting the caption data CD from the pixel values contained in the first predetermined image region P1 shown in FIG. 2A and produces the second set of pixel values and caption data position information PC.

The memory controller 460 receives the clock signals CLK, the Vs detection signal, the Hs count signal, white level detection signals and generates a memory control signal and the caption data position information PC, wherein, as shown in FIG. 4, the memory control signal includes write enable signals WE denoting the first predetermined image region P1 and read enable signals RE representing the second predetermined image region 26.

Each of the first set of pixel values is sequentially relayed to the buffer 464. In this case, upper 3 bits of the pixel value are sent to the AND gate 462 which generates a first buffer enable signal when all of the upper 3 bits are "111". That is, when the pixel value is larger than a first predetermined value, i.e., "1011", the first buffer enable signal is issued by the AND gate 462. The first buffer enable signal is then sent to the buffer 464 so that the pixel value having upper 3 bits of "111" is propagated or bypassed to the buffer 466 and the exclusive NOR gates 474 to 484. When the first buffer enable signal is absent, the pixel value is blocked by the buffer 464 and the buffer 464 generates a masked digital pixel value of "000000". As a result, the buffer 464 serves to generate a third set of pixel values wherein a pixel value contained in the first set of pixel values is masked by "0" when the pixel value is smaller than the predetermined value and each of the third set of pixel values is then sequentially provided as a current pixel value to the exclusive NOR gates 474 to 484 on a bit-by-bit basis.

The buffer 466 serves to sequentially delay the third set of pixel values by one clock unit in response to the clock signals CLK and to thereby generate delayed pixel values as a fourth set of pixel values wherein each of the fourth set of pixel values is sequentially provided as a previous pixel value to the exclusive NOR logic gates 474 to 484 on a bit-by-bit basis. Therefore, two consecutive pixel values, i.e., the current pixel value from the buffer 464 and the delayed pixel value, i.e., the previous pixel value, from the buffer 466, are exclusive-NORed at the exclusive NOR gates 474 to 484 on a bit-by-bit basis. The outputs from the exclusive NOR gates 474 to 484 are inputted to the AND gate 472 which generates a white level detection signal DS when all of the outputs from the exclusive NOR gates 474 to 484 are "111111". The white level detection signal DS is then sent to the buffer 468 and the memory controller 460.

As described above, the memory controller 460 receives the white level detection signal DS and generates the caption data position information denoting pixel positions contained in the second predetermined image region. The buffer 468 receives the white level detection signal DS as a second buffer enable signal and provides the current pixel value from the buffer 464 to the memory 490. That is, the buffer 468 generates a fifth set of pixel values in response to the white level detection signals wherein, when both of current and previous pixel values are identical to the second predetermined value, the present pixel value is assigned as one contained in the fifth set of pixel values and a white level detection signal is generated. The buffers 464, 466 and 468 for temporally storing the pixel values are made of conventional circuit components and may be preferably implemented by using, e.g., D-flip flops.

On the other hand, the memory 490 sequentially stores the second set of pixel values from the fifth set of pixel values in response to the clock signals CLK and the write enable signals WE denoting the first predetermined image region P1 shown in FIG. 2A. That is, when the write enable signal WE is issued, the memory 490 having a plurality of memory locations sequentially stores the second set of pixel values in accordance with the clock signals CLK. Thereafter, the memory 490 generates the stored second set of pixel values in response to the clock signals CLK and the read enable signal RE representing the second predetermined image region 26 shown in FIG. 2B.

In the D/A converter 52, the second set of pixel values is converted into the caption signal denoting the caption data in an analog format based on the clock signal CLK. The caption signal is sent to the video signal switching circuit 56 which combines the luminance signal and the caption signal in accordance with the caption data position information and the full screen display mode selection signal VOM from the system controller (not shown). The combined luminance signal is then relayed to the video processing circuit 30 shown in FIG. 1.

As is mentioned above, in the luminance signal processing path of the video processing circuit 30, the combined luminance signal is amplified and adjusted by using the predetermined operating parameters. Then, the adjusted luminance signal is combined with the color difference signal to produce the color representative signal. The color representative signal is adjusted in accordance with the display mode, i.e., the full screen display mode, and sent to the display device 50, wherein the electron beams produced by the display device 50 are swept in raster to form an image on its screen fit for an image of a wide aspect ratio, e.g., 16:9.

As can be seen from the above, the caption data display control circuit in accordance with the present invention is capable of automatically detecting caption data located on a predetermined image region and relocating the caption data on another predetermined image region in a visible area of the display screen to thereby effectively display the caption data contained in the standard video signal on the display device fit for an image of a wide aspect ratio. Furthermore, by employing the simple logic circuitry, e.g., exclusive NOR gate, AND gate or D-flip flop, the caption data display control circuit in accordance with the present invention can be easily implemented in the conventional television receiver to conveniently display the caption data on the visible display area of the display screen suitable for an image of a wide aspect ratio 16:9 in the full screen display mode.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for controlling the display of caption data contained in an image of an input standard video signal on a display screen of a television receiver, wherein the input standard video signal includes a luminance signal having the caption data and horizontal and vertical sync signals, the display screen suitable for displaying images of an aspect ratio different from that of the image of the input standard video signal and the television receiver using a full screen display mode to display the image on the entire display screen, which comprises:

control means, in response to the horizontal sync signals, for generating clock signals and, in response to the vertical and the horizontal sync signals, respectively, for generating vertical sync detection signals and horizontal sync count signals;

first conversion means, in response to the clock signals, for converting the luminance signal into a first set of pixel values corresponding to all of pixels constituting the image;

detection means, in response to the clock signals, the vertical sync detection signals and the horizontal sync count signals, for detecting a second set of pixel values representing the caption data from values of pixels located on a first predetermined image region within the image to generate the second set of pixel values and caption data position information denoting pixel positions within a second predetermined image region;

second conversion means, in response to the clock signals, for converting the second set of pixel values into a caption signal representing the caption data; and means for combining the caption signal with the luminance signal in accordance with the caption data position information in order to display the caption data on a visible region of the display screen in the full screen display mode.

2. The apparatus as recited in claim 1, wherein the detection means includes:

first comparison means for sequentially comparing each value in the first set of pixel values with a first predetermined pixel value to generate a third set of pixel values wherein a pixel value contained in the first set of pixel values is masked by "0" when the pixel value is smaller than the first predetermined pixel value and each of the third set of pixel values is sequentially provided as a current pixel value;

delay means, in response to the clock signals, for delaying the third set of pixel values on a pixel-by-pixel basis by one clock unit to generate a fourth set of pixel values wherein each of the fourth set of pixel values is sequentially provided as a previous pixel value;

second comparison means, receiving the third and the fourth sets of pixel values, sequentially, for comparing the current and the previous pixel values with a second predetermined pixel value to generate a fifth set of pixel values and white level detection signals wherein, when both of the current and the previous pixel values are identical to the second predetermined pixel value, the current pixel value is assigned as one contained in the fifth set of pixel values and the white level detection signals are generated;

memory means, in response to the clock signals and a write enable signal, for storing the second set of pixel values from the fifth set of pixel values and, in response to the clock signals and a read enable signal, for generating the second set of pixel values; and control signal generation means, in response to the vertical sync detection signals, the horizontal sync count signals and the white level detection signals, for generating the write enable signal denoting the first predetermined image region, the read enable signal representing the second predetermined image region and the caption data position information.

3. The apparatus as recited in claim 2, wherein each of the first set of pixel values is formed of N bits and the first comparison means includes an AND gate, receiving M upper bits of said each pixel value, for generating an enable signal when all of a predetermined upper bits are "1", wherein N and M are positive integers and M is smaller means N and buffer means for bypassing said each pixel value when the enable signal is present and for generating a zero masked pixel value when the enable signal is absent in order to produce the third set of pixel values.

4. The apparatus as recited in claim 3, wherein each of the previous and the current pixel values is formed of N bits and the second comparison means includes N number of exclusive NOR gates, each of the exclusive NOR gates receiving a pair of bits from the previous and the current pixel values, and an AND gate for generating the white level detection signals when each output of the N number of the exclusive NOR gates is "1" and buffer means, in response to the white level detection signals for propagating the current pixel values in order to generate the fifth set of pixel values.

5. The apparatus as recited in claim 4, wherein the buffer means includes N number of D-flip flops.

6. The apparatus as recited in claim 5, wherein the delay means includes N number of D-flip flops.

7. The apparatus as recited in claim 6, wherein N is 6 and M is 3.

8. An apparatus for controlling display of caption data contained in an image of an input standard video signal on a display screen of a television receiver, wherein the input standard video signal includes a luminance signal having the caption data and horizontal and vertical sync signals, the display screen suitable for displaying images of an aspect ratio different from that of the image of the input standard video signal and the television receiver using a full screen display mode to display the image on the entire display screen, which comprises:

means, in response to the luminance signal, for regulating a pedestal level of the luminance signal to generate a regulated luminance signal;

control means, in response to the horizontal sync signals, for generating clock signals and, in response to the vertical and the horizontal sync signals, respectively, for generating vertical sync detection signals and horizontal sync count signals;

first conversion means, in response to the clock signals, for converting the regulated luminance signal into a first set of pixel values corresponding to all of pixels constituting the image;

detection means, in response to the clock signals, the vertical sync detection signals and the horizontal sync count signals, for detecting a second set of pixel values representing the caption data from values of pixels located on a first predetermined image region within the image to generate the second set of pixel values and caption data position information denoting pixel positions within a second predetermined image region;

second conversion means, in response to the clock signals, for converting the second set of pixel values into a caption signal representing the caption data; and means for combining the caption signal with the regulated luminance signal in accordance with the caption data position information in order to display the caption data on a visible region of the display screen in the full screen display mode.

9. The apparatus as recited in claim 8, wherein the detection means includes:

first comparison means for sequentially comparing each value in the first set of pixel values with a first predetermined pixel value to generate a third set of pixel values wherein a pixel value contained in the first set of pixel values is masked by "0" when the pixel value is smaller than the first predetermined pixel value and each of the third set of pixel values is sequentially provided as a current pixel value;

delay means, in response to the clock signals, for delaying the third set of pixel values on a pixel-by-pixel basis by one clock unit to generate a fourth set of pixel values wherein each of the fourth set of pixel values is sequentially provided as a previous pixel value;

second comparison means, receiving the third and the fourth sets of pixel values, sequentially, for comparing the current and the previous pixel values with a second predetermined pixel value to generate a fifth set of pixel values and white level detection signals wherein, when both of the current and the previous pixel values are identical to the second predetermined pixel value, the current pixel value is assigned as one contained in the fifth set of pixel values and the white level detection signals are generated;

memory means, in response to the clock signals and a write enable signal, for storing the second set of pixel values from the fifth set of pixel values and, in response to the clock signal and a read enable signals for generating the second set of pixel values; and control signal generation means, in response to the vertical sync detection signals, the horizontal sync count signals and the white level detection signals, for generating the write enable signal denoting the first predetermined image region, the read enable signal representing the second predetermined image region and the caption data position information.

10. The apparatus as recited in claim 9, wherein each of the first set of pixel values is formed of N bits and the first comparison means includes an AND gate, receiving M upper bits of said each pixel value, for generating an enable signal when all of predetermined upper bits are "1", wherein N and M are positive integers and M is smaller than N and buffer means for bypassing said each pixel value when the enable signal is present and for generating a zero masked pixel value when the enable signal is absent in order to produce the third set of pixel values.

11. The apparatus as recited in claim 10, wherein each of the previous and the current pixel values is formed of N bits and the second comparison means includes N number of exclusive NOR gates, each of the exclusive NOR gates receiving a pair of bits from the previous and the current pixel values, and an AND gate for generating the white level detection signals when each output of the N number of the exclusive NOR gates is "1" and buffer means, in response to the white level detection signals for propagating the current pixel values in order to generate the fifth set of pixel values.

12. The apparatus as recited in claim 11, wherein the buffer mean includes N number of D-flip flops.

13. The apparatus as recited in claim 12, wherein the delay means includes N number of D-flip flops.

14. The apparatus as recited in claim 13, wherein N is 6 and M is 3.

* * * * *